(12) United States Patent
Muramatsu et al.

(10) Patent No.: US 6,593,413 B2
(45) Date of Patent: Jul. 15, 2003

(54) ROOM TEMPERATURE RAPID-CURABLE SILICONE COMPOSITION

(75) Inventors: Hironobu Muramatsu, Montpellier (FR); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/893,683

(22) Filed: Jun. 29, 2001

(65) Prior Publication Data

US 2002/0010251 A1 Jan. 24, 2002

(30) Foreign Application Priority Data

Jun. 30, 2000 (JP) .......................... 2000-198796

(51) Int. Cl.$^7$ .............................. C08L 83/04; C08K 3/36
(52) U.S. Cl. ........................ 524/493; 524/492; 524/588; 525/474; 528/12; 528/14; 528/34; 528/901
(58) Field of Search ................................. 524/492, 493, 524/588; 528/12, 14, 34.901; 525/474

(56) References Cited

U.S. PATENT DOCUMENTS

| | | | |
|---|---|---|---|
| 3,919,136 A | | 11/1975 | Smith |
| 4,226,063 A | * | 10/1980 | Chenel .................. 52/172 |
| 4,508,888 A | | 4/1985 | Letoffe et al. |
| 4,555,560 A | * | 11/1985 | Saruyama et al. .......... 524/860 |
| 4,569,980 A | * | 2/1986 | Sasaki et al. .............. 524/861 |
| 5,264,515 A | | 11/1993 | Cody et al. |
| 5,681,884 A | * | 10/1997 | Letoffe et al. ............. 524/405 |
| 5,789,480 A | * | 8/1998 | Adachi et al. ............. 524/863 |

FOREIGN PATENT DOCUMENTS

| | | |
|---|---|---|
| EP | 0 566 272 | 10/1993 |
| EP | 0 738 768 | 10/1996 |
| EP | 1 031 611 | 8/2000 |
| GB | 1308985 | 3/1973 |

* cited by examiner

Primary Examiner—Robert Dawson
Assistant Examiner—Jeffrey B. Robertson
(74) Attorney, Agent, or Firm—Oblon, Spivak, McClelland, Maier & Neustadt, P.C.

(57) ABSTRACT

A room temperature rapid-curable silicone composition is provided which includes (A) an organopolysiloxane terminated with hydroxyl groups, having a viscosity of from 25 mPa·s to 1,000,000 mPa·s at 25° C.; (B) a compound selected from the group consisting of a hydrolyzable silane represented by the following general formula (1):

$$R_n SiX_{4-n} \qquad (1)$$

wherein R represents a monovalent hydrocarbon group having 1 to 12 carbon atoms; X represents a compound selected from the group consisting of a ketoxime group, an alkoxyl group, an alkenoxyl group and an acyloxyl group; and n represents an integer of 0 to 2, and a partial hydrolysis-condensation product thereof; and (C) a water-containing wet-process silica having an average particle diameter of 100 μm or smaller, which is a chief source for feeding water necessary for condensation curing reaction. This composition has a good storage stability, is rapid-curable upon mere blending, and becomes an elastic body with good heat resistance, moisture resistance and water-exposure adhesive properties. The composition is useful as a sealant for various electric and electronic parts and common constructional joints, as an oil seal for automobiles and also as a coating material.

13 Claims, 1 Drawing Sheet

ROOM TEMPERATURE RAPID-CURABLE SILICONE COMPOSITION

BACKGROUND OF THE INVENTION

1. Field of the Invention

This invention relates to a room temperature rapid-curable silicone composition which has a superior storage stability, and also is rapid-curable upon mere blending, becomes an elastic body having superior heat resistance, moisture resistance and water-exposure adhesive properties and is preferably usable as a sealant for various electric and electronic parts and common constructional joints, as an oil seal for automobiles and also as a coating material required to have follow-up properties.

2. Description of the Prior Art

In recent years, in the market for silicone, room temperature rapid-curable materials of a two-part or three-part type have increasingly become important for the purpose of the rationalization of operation.

Room temperature rapid-curable silicone materials conventionally used include addition reaction curable materials, condensation rapid-curable materials and amine-ketone dehydration condensation curable materials. However, in the case of the addition reaction curable materials, platinum catalysts may be poisoned by any impurities on substrate surfaces to cause curing inhibition which provides an obstacle, and hence the materials can not be expected to be applicable to a wide range of substrates. In the case of the condensation rapid-curable materials, water necessary for curing is brought in the form of an emulsion or the like, and hence they have critical disadvantages that their curability may vary with time and, in the worst case, they may separate. Also, in the case of a ketimine and water-producing material based on an amine-ketone reaction as reported in Japanese Laid-open Publication (Kokai) No. 5-279570, materials generally good in respect of curability and storage stability are obtainable, but especially an irritating odor due to the amine compound and a corrosive action on substrates come into question. Hence, such materials may be limited to some operation and use.

SUMMARY OF THE INVENTION

The present invention was made in order to improve the above circumstances. Accordingly, an object of the present invention is to provide a room temperature rapid-curable silicone composition having superior curability, durability and storage stability while sufficiently exhibiting properties inherent in silicone compositions.

As a result of extensive studies made in order to achieve the above object, the present inventors have discovered that the use of a composition comprised basically of an organopolysiloxane, a hydrolyzable silane and a water-containing wet-process silica makes it possible to obtain a composition having a good rapid-curability, being completely deep-curable and adhesive without regard to materials of substrates and also having very superior storage stability. They have also discovered that this composition has properties such as sealing properties, substrate follow-up properties and dust-proofing properties and can furnish a cured product having superior general physical properties such as various electrical properties and mechanical properties. Thus, they have accomplished the present invention.

Accordingly, the present invention provides a room temperature rapid-curable silicone composition making use of a wet-process silica as a chief source for feeding water necessary for condensation curing reaction.

More specifically, the silicone composition of the present invention is a room temperature rapid-curable silicone composition comprising:

(A) 100 parts by weight of an organopolysiloxane terminated with hydroxyl groups, having a viscosity of from 25 mPa·s to 1,000,000 mPa·s at 25° C.;

(B) from 2 parts by weight to 50 parts by weight of at least one compound selected from the group consisting of a hydrolyzable silane represented by the following general formula (1):

$$R_nSiX_{4-n} \tag{1}$$

wherein R may be the same or different when it is in plurality, and represents a monovalent hydrocarbon group having 1 to 12 carbon atoms; X represents at least one group selected from the group consisting of a ketoxime group, an alkoxyl group, an alkenoxyl group and an acyloxyl group; and n represents an integer of 0 to 2, and a partial hydrolysis-condensation product thereof; and (C) from 3 parts by weight to 200 parts by weight of a water-containing wet-process silica having an average particle diameter of 100 μm or smaller; the component (C) being a chief source for feeding water necessary for condensation curing reaction.

DESCRIPTION OF THE PREFERRED EMBODIMENTS

Figure 1:
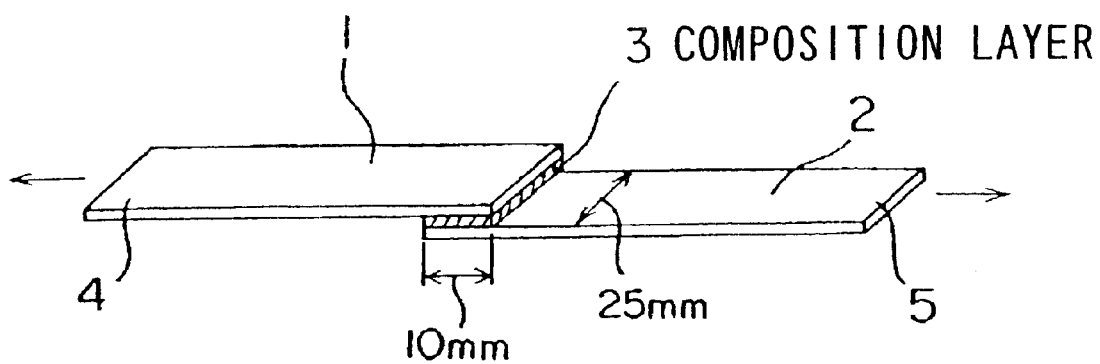
FIG. 1 is a perspective view of a test piece used to measure adhesive strength under shear of a cured layer of the composition of the present invention.

The present invention will be described below in detail.

The composition according to the present invention comprises a component-(A) organopolysiloxane, a component-(B) and a component-(C) water-containing wet-process silica.

Component (A)

The component (A) is a base polymer, and a diorganopolysiloxane is used as the base polymer. In the present invention, the base polymer is required to have been terminated with hydroxyl groups at both terminals of the molecular chain. More specifically, because of the presence of such hydroxyl groups, the base polymer undergoes condensation with the component (B) to form a rubber like elastic cured product. Also, other organic groups may be bonded to the silicon atoms that constitute the base polymer. Such organic groups may include, e.g., alkyl groups such as a methyl group, an ethyl group and a propyl group, cycloalkyl groups such as a cyclohexyl group, alkenyl groups such as a vinyl group and an allyl group, aryl groups such as a phenyl group and a tolyl group, and any of these groups the hydrogen atoms of which have partially been substituted with a halogen atom or atoms as exemplified by a chloromethyl group and a 3,3,3-trifluoropropyl group; and may preferably be methyl groups.

The component-(A) base polymer is also required to have a viscosity at 25° C. within the range of from 25 to 1,000,000 mPa·s. If it has a viscosity outside this range, difficulties may arise such that any rubber like elastic cured product having satisfactory properties can be obtained with difficulty and a low operability may result. Also, this base polymer has a degree of polymerization usually of an integer of 10 or more since this organopolysiloxane has the viscosity within the above range.

This organopolysiloxane may typically be a compound represented by the following general formula (2):

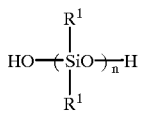

(2)

wherein in the formula, $R^1$ is the above organic group, and n is an integer that provides a viscosity at 25° C. of from 25 to 1,000,000 mPa·s, and preferably from 500 to 100,000 mPa·s.

Component (B)

The component (B) is at least one of a hydrolyzable silane represented by the following general formula (1) and a partial hydrolysis-condensation product thereof.

$$R_nSiX_{4-n} \quad (1)$$

wherein R may be the same or different when it is in plurality, and represents a monovalent hydrocarbon group having 1 to 12 carbon atoms; X represents at least one hydrolyzable group selected from the group consisting of a ketoxime group, an alkoxyl group, an alkenoxyl group and an acyloxyl group; and n represents an integer of 0 to 2. This compound acts as a cross-linking agent in the composition of the present invention. The hydrolyzable group represented by X reacts with the terminal hydroxyl groups of the component (A) to make cross-linking proceed, and also reacts with the water contained in the component (C) detailed later, to undergo hydrolysis and condensation to make the cross-linking proceed further.

Specific examples of the hydrolyzable silane represented by the general formula (1), include, but not limited to, as hydrolyzable silanes having a ketoxime group, e.g., dimethyldi(butanoxime)silane, methyltri(butanoxime) silane, vinyltri(butanoxime)silane, phenyltri(butanoxime) silane, propyltri(butanoxime)silane, tetra(butanoxime) silane, 3,3,3-trifluoropropyltri(butanoxime)silane, 3-chloropropyltri(butanoxime)silane, methyltri (propanoxime)silane, methyltri(pentanoxime)silane, methyltri(isopentanoxime)silane, vinyltri (cyclopentanoxime)silane and methyltri(cyclohexanoxime) silane; as hydrolyzable silanes having an alkoxyl group, e.g., dimethyldimethoxysilane, methyltrimethoxysilane, vinyltrimethoxysilane, phenyltrimethoxysilane, methyltriethoxysilane, tetramethoxysilane and tetraethoxysilane; as hydrolyzable silanes having an alkenoxyl group, e.g., vinyltripropenoxysilane and phenyltripropenoxysilane; and as hydrolyzable silanes having an acyloxyl group, e.g. methyltriacetoxysilane, ethyltriacetoxysilane, phenyltriacetoxysilane, vinyltriacetoxysilane and tetraacetoxysilane.

Component (C)

The component (C) is a water-containing wet-process silica having an average particle diameter of 100 μm or smaller, and preferably from 0.1 to 50 μm. This wet-process silica has porous particle surfaces because of its production process, and the water held and kept remaining in fine gaps at such surfaces may preferably be in a content ranging from 1 to 10% by weight, and particularly preferably from 1.5 to 5% by weight. Such a silica may be used. This water reacts with the above component (B) to cause hydrolysis reaction and the condensation curing proceeds. If the water is in a too small content, the resultant composition may not exhibit the rapid-curability which is a feature of the present invention. If the water is in a too large content, the composition may cure so greatly abruptly as to adversely affect physical properties of the cured product to be obtained.

This wet-process silica may be those available as usual industrial materials. Also, its particle surfaces may be made hydrophobic so that the resultant composition can preferably be improved in safety and storage stability. Wet-process silica larger than 100 μm in average particle diameter is not desirable because it may make the cured product have low physical properties.

This component (C) may be mixed in an amount of from 3 to 200 parts by weight, and preferably from 5 to 50 parts by weight, based on 100 parts by weight of the component (A). If it is in an amount less than 3 parts by weight, the resultant composition can not exhibit the intended room-temperature rapid-curability. If it is in an amount more than 200 parts by weight, it may be mixed in the component-(A) organopolysiloxane with difficulty. The wet-process silica is by no means limited to one type, and a plurality of wet-process silica with various grades may be used in combination.

Preparation of Composition

In the present invention, when the above silicone composition is prepared, it is preferable not to make what is called heat treatment, like that in which the component-(A) organopolysiloxane and the component-(C) wet-process silica are mixed at 100° C. or above for 30 minutes or longer with stirring. Heat treatment made by mixing at 100° C. or above may cause the water in the wet-process silica to volatilize and scatter away, resulting in loss of the intended rapid-curability. Accordingly, in the preparation of the present silicone composition, mixing may preferably be carried out at a temperature below 100° C., and more preferably 70° C. or below. This, however, does not necessarily apply when the organopolysiloxane and wet-process silica are mixed with heating at 100° C. or above and wet-process silica for feeding water is anew further added.

In the present room temperature rapid-curable silicone composition, a curing catalyst may preferably be used. The curing catalyst is exemplified by organometallic compounds including alkyltin esters such as dibutyltin diacetate, dibutyltin dilaurate and dibutyltin dioctoate, titanates or titanium chelate compounds such as tetraisopropoxytitanium, tetra-n-butoxytitanium, tetrakis(2-ethylhexoxy)titanium, dipropoxybis(acetylacetonato)titanium and titanium isopopoxyoctylene glycol, zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds; aminoalkyl-substituted alkoxysilanes such as 3-aminopropyltriethoxysilane and N-β-(aminoethyl)-γ-aminopropyltrimethoxysilane; amine compounds and salts thereof such as hexylamine and dodecyldodecylamine phosphate; quaternary ammonium salts such as benzyltriethylammonium acetate; alkali metal lower fatty acid salts such as potassium acetate, sodium acetate and lithium oxalate; dialkylhydroxylamines such as dimethylhydroxylamine and diethylhydroxylamine; and silanes or siloxanes containing a guanidyl group, such as tetramethylguanidylpropyltrimethoxysilane, tetramethylguanidylpropylmethyldimethoxysilane and tetramethylguanidylpropyltris(trimethylsiloxy)silane. Any of these may not necessarily be used alone, and may be used in the form of a mixture of two or more types. Incidentally, any of these curing catalysts may be mixed in an amount of from 0 to 10 parts by weight, and particularly from 0.01 to 5 parts by weight, based on 100 parts by weight of the silicone composition.

Besides the wet-process silica, which is used to accelerate curing, a filler such as fumed silica, quartz powder, zinc carbonate or surface-treated calcium carbonate may also be added as an inorganic filler in order to improve physical strength and so forth required as the silicone composition. Here, if the filler is mixed in an amount more than 300 parts by weight based on 100 parts by weight of the silicone composition, the composition itself may have so high a viscosity as to have an extremely low flow properties, resulting in a low operability. Accordingly, it may preferably be mixed in an amount not more than 300 parts by weight.

As long as what is aimed in the present invention is not damaged, it is also possible to add an adhesive component comprised of a substance containing at least one group selected from an alkoxysilyl group, an amino group, an epoxy group, a hydrosilyl group, an acrylic group or a hydroxysilyl group, or a mixture of these; a diluent such as a non-reactive organopolysiloxane; a reinforcing material such as a silicone resin comprised of an M unit and a Q unit (M unit may be any of those substituted with an alkenyl group or an aryl group); an organopolysiloxane having a fluoroalkyl group in the molecule; a viscosity and hardness modifier; a colorant including inorganic pigments such as cobalt blue and organic dyes such as an azo dye and an anthracene dye; thermal-conductivity, heat resistance and flame retardance improvers such as alumina, aluminum hydroxide, carbon black, silver powder, gold powder, magnesium compound, zinc white, cerium oxide, zinc carbonate, manganese carbonate, iron oxide red and titanium oxide; and also a mildewproofing agent, an anti-fungus agent, glass balloons, a flatting agent, and a perfume.

In the preparation of the silicone composition, these components must be mixed until they become sufficiently uniform. In the preparation of this silicone composition, the composition may be prepared by a method making use of a mixer such as a Ross mixer, a planetary mixer or a universal Shinagawa agitator.

The composition of the present invention can be obtained as a one-part type room temperature rapid-curable silicone composition by uniformly mixing at least the components (A) to (C) in the stated amounts in a dry atmosphere. In order to ensure a long-term storage stability, the components (A) to (C) may preferably previously be divided into two parts in such a way that the component (B) and the component (C) belong to a part different from each other and the two parts may be blended when used. Stated specifically, a portion of the component (A) and all the component (B) may be put in one part and the remainder of the component (A) and all the component (C) may be put in a different part. Alternatively, the components (A) and (C) may be set as one part and the component (B) may be set as a different part. These may be packed for each part when stored, and then the two parts are blended when used.

When the present composition is used, a static mixer, a dynamic mixer or the like may be employed as a mixer. The two parts may be blended in a ratio of from 1:100 to 100:1, preferably from 1:10 to 10:1, and more preferably from 1:1. If their blending ratio is larger or smaller than the ratio of from 1:100 to 100:1, they may be blended in a low precision, also bringing about a disadvantage industrially. In view of the character of the present invention, it is very easy to set the blending ratio to 1:1. This can be said to be very advantageous for operation, too.

For the purpose of improving operability when used as a coating material, the present composition may be so diluted that the components (A) to (C) come to be in a concentration of from 1 to 99% by weight, and preferably from 30 to 80% by weight, which may be diluted with a solvent in which the other components of the silicone composition are soluble. The solvent may be selected from, e.g., branched or straight-chain paraffinic saturated hydrocarbons, aromatic hydrocarbons such as xylene and toluene, and also isopropyl alcohol, methyl ethyl ketone, cyclohexanone, hexamethyldisiloxane and octamethyltetrasiloxane. When this silicone composition is applied to a substrate, brush coating, roll coating, dip coating, coating making use of a dispenser, spray coating or the like method may be employed.

Utility

The room temperature rapid-curable silicone composition of the present invention can be used in a wide range including electric and electronic use, constructional use, automobile use, craftwork use, dress and its ornaments industrial use, medical use and so forth.

EXAMPLES

The present invention is described below in greater detail by giving Examples. The present invention is by no means limited to these.

Example 1

Part (1): 50 parts by weight of dimethylpolysiloxane terminated with hydroxyl groups at both terminals of the molecular chain and having a viscosity at 25° C. of 20,000 mPa·s and 10 parts by weight of fumed silica having a BET specific surface area of 200 m$^2$/g were mixed at 150° C. for 2 hours with stirring. Thereafter, the mixture obtained was diluted with 50 parts by weight of dimethylpolysiloxane terminated with hydroxyl groups at both terminals of the molecular chain and having a viscosity at 25° C. of 20,000 mPa·s, followed by further addition of 8 parts by weight of methyltri(butanoxime)silane, 0.1 part by weight of dioctyltin dioctoate and 1.0 part by weight of aminopropyltrimethoxysilane, and these materials were subjected to deaeration with mixing.

Part (2): 50 parts by weight of dimethylpolysiloxane terminated with hydroxyl groups at both terminals of the molecular chain and having a viscosity at 25° C. of 20,000 mPa·s and 20 parts by weight of a wet-process silica having a bulk specific gravity of 60 g/L, an average particle diameter of 2.0 $\mu$m and a primary particle diameter of 20 nm and containing about 3.5% by weight of water were mixed with stirring. Thereafter, the mixture obtained was diluted with 50 parts by weight of dimethylpolysiloxane terminated with hydroxyl groups at both terminals of the molecular chain and having a viscosity at 25° C. of 20,000 mPa·s, and these materials were subjected to deaeration with mixing.

The above part (1) and part (2) were 1:1 blended by means of a static mixer. As the result, the composition obtained had a pot life of 30 minutes and had a good rapid-curability due to which its curing proceeded at both the surface and the depth. This composition was cured under conditions of 23° C. and 3 days. As the result, a rubberlike elastic cured product was obtained which had a good external appearance and had good physical properties, i.e., a durometer type-A hardness of 25, a tensile strength of 2.0 MPa, an elongation at break of 250%, a tensile adhesive strength under shear with respect to aluminum of 1.1 MPa (adhesion area: 2.5 cm$^2$; adhesive-layer thickness: 2 mm) and a tensile adhesive strength under shear with respect to copper of 1.0 MPa. Here, the tensile adhesive strength under shear with respect to aluminum and copper was measured in the following way: As shown in FIG. 1, substrate pieces 1 and 2 having surfaces 4 and 5, respectively, made of aluminum or copper which were each 50 mm long, 25 mm wide and 0.2 mm thick were so bonded as to overlap each other at their one ends over a length of 10 mm with a 2 mm thick composition layer 3 interposed between them, followed by curing. The bonded test piece thus obtained was pulled at its both ends in the direction of arrows by means of a tensile tester. In the following examples, the adhesive strength under shear was measured in the same way without regard to the type of substrates.

This silicone composition showed a maximum tensile stress of 0.5 MPa, an elongation of 90% and a cohesive failure of 100% in a JIS-H type block test on a float glass sheet, and was found to be suitable as a rapid-curabile sealant for constructional glass.

The above part (1) and part (2) were stored at room temperature for 6 months, and thereafter 1:1 blended by means of a static mixer. As the result, the composition obtained had a pot life of 40 minutes and had kept a good rapid-curability due to which its curing proceeded at both of the surface and the depth. This composition was cured under conditions of 23° C. and 3 days. As the result, a rubberlike elastic cured product was obtained which had a good external appearance and had good physical properties which are almost not different from the initial physical properties, i.e., a durometer type-A hardness of 23, a tensile strength of 1.8 MPa, an elongation at break of 280% and a tensile adhesive strength under shear with respect to aluminum of 1.0 MPa.

Comparative Example 1-1

Part (1): 50 parts by weight of dimethylpolysiloxane terminated with hydroxyl groups at both terminals of the molecular chain and having a viscosity at 25° C. of 20,000 mPa·s and 10 parts by weight of fumed silica having a BET specific surface area of 200 m$^2$/g were mixed at 150° C. for 2 hours with stirring. Thereafter, the mixture obtained was diluted with 50 parts by weight of dimethylpolysiloxane terminated with hydroxyl groups at both terminals of the molecular chain and having a viscosity at 25° C. of 20,000 mPa·s, followed by further addition of 8 parts by weight of methyltri(butanoxime)silane, 0.1 part by weight of dioctyltin dioctoate and 1.0 part by weight of aminopropyltrimethoxysilane, and these materials were subjected to deaeration with mixing.

Part (2): 50 parts by weight of dimethylpolysiloxane terminated with hydroxyl groups at both terminals of the molecular chain and having a viscosity at 25° C. of 20,000 mPa·s and 10 parts by weight of fumed silica having a BET specific surface area of 200 m$^2$/g were mixed at 150° C. for 2 hours with stirring. Thereafter, the mixture obtained was diluted with 50 parts by weight of dimethylpolysiloxane terminated with hydroxyl groups at both terminals of the molecular chain and having a viscosity at 25° C. of 20,000 mPa·s, and these materials were subjected to deaeration with mixing.

The above part (1) and part (2) were 1:1 blended by means of a static mixer. As the result, the curing of the composition obtained proceeded only from its surface. This composition was cured under conditions of 23° C. and 3 days. As the result, it cured insufficiently at the depth, and showed rubber properties insufficient in strength such that it was in a durometer type-A hardness of 15 at best, a tensile strength of 0.7 MPa and an elongation at break of 450%. Moreover, the tensile adhesive strength under shear with respect to aluminum or copper was not measurable because of non-curing at the depth.

Comparative Example 1-2

Part (1): 50 parts by weight of dimethylpolysiloxane terminated with hydroxyl groups at both terminals of the molecular chain and having a viscosity at 25° C. of 20,000 mPa·s and 10 parts by weight of fumed silica having a BET specific surface area of 200 m$^2$/g were mixed at 150° C. for 2 hours with stirring. Thereafter, the mixture obtained was diluted with 50 parts by weight of dimethylpolysiloxane terminated with hydroxyl groups at both terminals of the molecular chain and having a viscosity at 25° C. of 20,000 mPa·s, followed by further addition of 8 parts by weight of methyltri(butanoxime)silane, 0.1 part by weight of dioctyltin dioctoate and 1.0 part by weight of aminopropyltrimethoxysilane, and these materials were subjected to deaeration with mixing.

Part (2): 50 parts by weight of dimethylpolysiloxane terminated with hydroxyl groups at both terminals of the molecular chain and having a viscosity at 25° C. of 20,000 mPa·s and 10 parts by weight of fumed silica having a BET specific surface area of 200 m$^2$/g were mixed at 150° C. for 2 hours with stirring. Thereafter, the mixture obtained was diluted with 50 parts by weight of dimethylpolysiloxane terminated with hydroxyl groups at both terminals of the molecular chain and having a viscosity at 25° C. of 20,000 mPa·s, followed by addition of 5 parts by weight of a silicone emulsion obtained by dispersing 25% by weight of water in dimethylsilicone, and these materials were subjected to deaeration with mixing.

The above part (1) and part (2) were 1:1 blended by means of a static mixer. As the result, the composition obtained had a pot life of 10 minutes and had a good rapid-curability due to which its curing proceeded at both the surface and the depth. This composition was cured under conditions of 23° C. and 3 days. As the result, a rubberlike elastic cured product was obtained which had a good external appearance and had physical properties that it was in a durometer type-A hardness of 25, a tensile strength of 1.6 MPa, an elongation at break of 170% and a tensile adhesive strength under shear with respect to aluminum of 0.9 MPa (adhesion area: 2.5 cm$^2$; adhesive-layer thickness: 2 mm).

However, as a result of storage of the above part (1) and part (2) at room temperature for 6 months, the part (2) became thick and half gelled to such a level as to be not blendable by means of the static mixer.

Comparative Example 1-3

Part (1): 50 parts by weight of dimethylpolysiloxane terminated with hydroxyl groups at both terminals of the molecular chain and having a viscosity at 25° C. of 20,000 mPa·s and 10 parts by weight of fumed silica having a BET specific surface area of 200 m$^2$/g were mixed at 150° C. for 2 hours with stirring. Thereafter, the mixture obtained was diluted with 50 parts by weight of dimethylpolysiloxane terminated with hydroxyl groups at both terminals of the molecular chain and having a viscosity at 25° C. of 20,000 mPa·s, followed by further addition of 8 parts by weight of methyltri(butanoxime)silane, 0.1 part by weight of dioctyltin dioctoate, 1.0 part by weight of aminopropyltrimethoxysilane and 3.0 parts by weight of butylamine, and these materials were subjected to deaeration with mixing.

Part (2): 50 parts by weight of dimethylpolysiloxane terminated with hydroxyl groups at both terminals of the molecular chain and having a viscosity at 25° C. of 20,000 mPa·s and 10 parts by weight of fumed silica having a BET specific surface area of 200 m$^2$/g were mixed at 150° C. for 2 hours with stirring. Thereafter, the mixture obtained was diluted with 50 parts by weight of dimethylpolysiloxane terminated with hydroxyl groups at both terminals of the molecular chain and having a viscosity at 25° C. of 20,000 mPa·s, followed by further addition of 3.0 parts by weight of methyl ethyl ketone, and these materials were subjected to deaeration with mixing.

The above part (1) and part (2) were 1:1 blended by means of a static mixer. As the result, the composition obtained had a pot life of 15 minutes and had a good rapid-curability due to which its curing proceeded at both the surface and the depth. This composition was cured under conditions of 23° C. and 3 days. As the result, a rubberlike elastic cured product was obtained which had a good external appearance and had physical properties that it was in a durometer type-A hardness of 21, a tensile strength of 1.5 MPa, an elongation at break of 150%, a tensile adhesive strength under shear with respect to aluminum of 0.8 MPa (adhesion area: 2.5 cm$^2$; adhesive-layer thickness: 2 mm) and a tensile adhesive strength under shear with respect to copper of 0.7 MPa.

However, these part (1) and part (2) gave off so offensive an odor as to be very unpleasant during operation. Also, the composition caused copper sheets to discolor into violet, being seen to be corrosive.

Example 2

Part (1): 50 parts by weight of dimethylpolysiloxane terminated with hydroxyl groups at both terminals of the molecular chain and having a viscosity at 25° C. of 80,000 mPa·s and 50 parts by weight of colloidal calcium carbonate surface-treated with a fatty acid and having an average particle diameter of 0.05 µm were mixed with stirring. Thereafter, the mixture obtained was diluted with 35 parts by weight of dimethylpolysiloxane terminated with trimethylsilyl groups at both terminals of the molecular chain and having a viscosity at 25° C. of 30 mPa·s, followed by further addition of 8 parts by weight of phenyltri(butanoxime)silane, 0.5 part by weight of dioctyltin dioctoate and 3.0 part by weight of ethylenediaminopropyltrimethoxysilane, and these materials were subjected to deaeration with mixing.

Part (2): 50 parts by weight of dimethylpolysiloxane terminated with hydroxyl groups at both terminals of the molecular chain and having a viscosity at 25° C. of 80,000 mPa·s and 40 parts by weight of colloidal calcium carbonate surface-treated with a fatty acid and having an average particle diameter of 0.05 µm were mixed with stirring. Thereafter, 20 parts by weight of a wet-process silica having a bulk specific gravity of 150 g/L, an average particle diameter of 4.0 µm and a primary particle diameter of 30 nm and containing about 3.5% by weight of water were mixed with stirring. Thereafter, the mixture obtained was diluted with 35 parts by weight of dimethylpolysiloxane terminated with trimethylsilyl groups at both terminals of the molecular chain and having a viscosity at 25° C. of 30 mPa·s, and these materials were subjected to deaeration with mixing.

The above part (1) and part (2) were 1:1 blended by means of a static mixer. As the result, the composition obtained had a pot life of 35 minutes and had a good rapid-curability due to which its curing proceeded at both the surface and the depth. This composition was cured under conditions of 23° C. and 3 days. As the result, a rubberlike elastic cured product was obtained which had a good external appearance and had good physical properties, i.e., a durometer type-A hardness of 15, a tensile strength of 1.4 MPa, an elongation at break of 1,050%, a tensile adhesive strength under shear with respect to nylon 6 of 0.7 MPa (adhesion area: 2.5 cm$^2$; adhesive-layer thickness: 2 mm) and a tensile adhesive strength under shear with respect to nylon 66 of 0.8 MPa.

The above part (1) and part (2) were stored at room temperature for 6 months, and thereafter 1:1 blended by means of a static mixer. As the result, the composition obtained had a pot life of 45 minutes and had kept a good rapid-curability due to which its curing proceeded at both the surface and the depth. This composition was cured under conditions of 23° C. and 3 days. As the result, a rubberlike elastic cured product was obtained which had a good external appearance and had good physical properties almost not different from initial physical properties, i.e., a durometer type-A hardness of 13, a tensile strength of 1.3 MPa, an elongation at break of 980%, a tensile adhesive strength under shear with respect to nylon 6 of 0.7 MPa and a tensile adhesive strength under shear with respect to nylon 66 of 0.7 MPa.

Comparative Example 2

Part (1): 50 parts by weight of dimethylpolysiloxane terminated with hydroxyl groups at both terminals of the molecular chain and having a viscosity at 25° C. of 80,000 mPa·s and 50 parts by weight of colloidal calcium carbonate surface-treated with a fatty acid and having an average particle diameter of 0.05 µm were mixed with stirring. Thereafter, the mixture obtained was diluted with 35 parts by weight of dimethylpolysiloxane terminated with hydroxyl groups at both terminals of the molecular chain and having a viscosity at 25° C. of 30 mPa·s, followed by further addition of 8 parts by weight of phenyltri(butanoxime)silane, 0.5 part by weight of dioctyltin dioctoate and 3.0 part by weight of ethylenediaminopropyltrimethoxysilane, and these materials were subjected to deaeration with mixing.

Part (2): 50 parts by weight of dimethylpolysiloxane terminated with hydroxyl groups at both terminals of the molecular chain and having a viscosity at 25° C. of 80,000 mPa·s and 50 parts by weight of colloidal calcium carbonate surface-treated with a fatty acid and having an average particle diameter of 0.05 µm were mixed with stirring. Thereafter, the mixture obtained was diluted with 35 parts by weight of dimethylpolysiloxane terminated with trimethylsilyl groups at both terminals of the molecular chain and having a viscosity at 25° C. of 30 mPa·s, followed by addition of 5 parts by weight of a silicone emulsion obtained by dispersing 25% by weight of water in dimethylsilicone, and these materials were subjected to deaeration with mixing.

The above part (1) and part (2) were 1:1 blended by means of a static mixer. As the result, the composition obtained had a pot life of 10 minutes and had a good rapid-curability due to which its curing proceeded at both the surface and the depth. This composition was cured under conditions of 23° C. and 3 days. As the result, a rubberlike elastic cured product was obtained which had good physical properties, i.e., a durometer type-A hardness of 14, a tensile strength of 1.5 MPa, an elongation at break of 1,100%, a tensile adhesive strength under shear with respect to nylon 6 of 0.8 MPa (adhesion area: 2.5 cm$^2$; adhesive-layer thickness: 2 mm) and a tensile adhesive strength under shear with respect to nylon 66 of 0.8 MPa.

However, as a result of storage of the above part (1) and part (2) at room temperature for 6 months and where they were 1:1 blended by means of a static mixer, although each part had not become thick, the curing of the composition obtained proceeded only from its surface and the rapid-curability had been lost. This composition was cured under conditions of 23° C. and 3 days. As the result, only a rubberlike elastic product cured insufficiently was obtainable which was in a durometer type-A hardness of 11, a tensile strength of 0.6 MPa and an elongation at break of 1,100%. The tensile adhesive strength under shear with respect to nylon 6 or nylon 66 was not measurable because of non-curing at the depth.

Example 3

Chief-agent part: 60 parts by weight of dimethylpolysiloxane terminated with hydroxyl groups at both terminals of the molecular chain and having a viscosity at 25° C. of 5,000 mPa·s and 25 parts by weight of a hydrophobic-treated wet-process silica having a bulk specific gravity of 150 g/L, an average particle diameter of 4.0 μm and a primary particle diameter of 30 nm and containing about 3.5% by weight of water were mixed with stirring. Thereafter, the mixture obtained was diluted with 1.5 parts by weight of dimethylpolysiloxane terminated with hydroxyl groups at both terminals of the molecular chain and having a viscosity at 25° C. of 30 mPa·s, and these materials were subjected to deaeration with mixing.

Curing-agent part: 6 parts by weight of phenyltripropenoxysilane, 1.5 parts by weight of tetramethylguanidyltrimethoxysilane and 2.5 parts by weight of trimethoxysilyl propyl isocyanate were subjected to deaeration with mixing.

The above chief-agent part and curing-agent part were 10:1 blended by means of a dynamic mixer. As the result, the composition obtained had a gel time of 20 minutes and had a good rapid-curability due to which its curing proceeded at both the surface and the depth. This composition was cured under conditions of 23° C. and 3 days. As the result, a potting-material cured product was obtained which had a good external appearance, a durometer type-A hardness of 25, a tensile strength of 1.0 MPa, an elongation at break of 150% and good adhesive properties to electronic substrates.

The above chief-agent part and curing-agent part were stored at room temperature for 6 months, and thereafter 10:1 blended by means of a dynamic mixer. As the result, the composition obtained had a gel time of 25 minutes and had kept a good rapid-curability due to which its curing proceeded at both the surface and the depth. This composition was cured under conditions of 23° C. and 3 days. As the result, a potting-material cured product was obtained which had a good external appearance, a durometer type-A hardness of 23, a tensile strength of 0.9 MPa, an elongation at break of 160% and good adhesive properties to electronic substrates.

Comparative Example 3

Chief-agent part: 60 parts by weight of dimethylpolysiloxane terminated with hydroxyl groups at both terminals of the molecular chain and having a viscosity at 25° C. of 5,000 mPa·s and 15 parts by weight of fumed silica having a BET specific surface area of 200 m²/g were mixed at 150° C. for 2 hours with stirring. Thereafter, the mixture obtained was diluted with 15 parts by weight of dimethylpolysiloxane terminated with trimethylsilyl groups at both terminals of the molecular chain and having a viscosity at 25° C. of 30 mPa·s, and these materials were subjected to deaeration with mixing.

Curing-agent part: 6 parts by weight of phenyltripropenoxysilane, 1.5 parts by weight of tetramethylguanidyltrimethoxysilane and 2.5 parts by weight of trimethoxysilyl propyl isocyanate were subjected to deaeration with mixing.

The above chief-agent part and curing-agent part were 10:1 blended by means of a dynamic mixer. As the result, the composition obtained had only a curability due to which its curing proceeded only from the surface. This composition was cured under conditions of 23° C. and 3 days. As the result, a potting-material cured product was obtained which had a durometer type-A hardness of 20, a tensile strength of 1.3 MPa, an elongation at break of 240% and good adhesive properties to electronic substrates. However, as a result of storage of the chief-agent part and curing-agent part at room temperature for 6 months, the chief-agent part became thick and half gelled to such an extent as to be unable to be put in the dynamic mixer.

As described above, the room temperature rapid-curable silicone composition of the present invention has a good rapid-curability, is completely deep-curable without regard to materials of substrates and adhesive to the substrates, and also has very superior storage stability.

What is claimed is:

1. A room temperature rapid-curable silicone composition comprising:

(A) 100 parts by weight of an organopolysiloxane terminated with hydroxyl groups, having a viscosity of from 25 mPa·s to 1,000,000 mPa·s at 25° C.;

(B) from 2 parts by weight to 50 parts by weight of at least one compound selected from the group consisting of a hydrolyzable silane represented by the following general formula (1):

$$R_n SiX_{4-n} \quad (1)$$

wherein R may be the same or different when it is in plurality, and represents a monovalent hydrocarbon group having 1 to 12 carbon atoms; X represents at least one group selected from the group consisting of a ketoxime group, an alkoxyl group, an alkenoxyl group and an acyloxyl group; and n represents an integer of 0 to 2, and a partial hydrolysis-condensation product thereof; and (C) from 3 parts by weight to 200 parts by weight of a water-containing wet-process silica having an average particle diameter of 0.1 μm to 50 μm; the component (C) being a chief source for feeding water necessary for condensation reaction causing curing of the composition.

2. The composition according to claim 1, wherein the component-(A) organopolysiloxane is a diorganopolysiloxane represented by the following general formula (2):

$$(2)$$

wherein $R^1$ is an alkyl group, a cycloalkyl group, an alkenyl group, an aryl group or any of these groups the hydrogen atoms of which have partially been substituted with a halogen atom or atoms; and n is an integer that provides a viscosity at 25° C. of from 25 to 1,000,000 mPa·s.

3. The composition according to claim 2, wherein, in the general formula (1), the n is an integer that provides a viscosity at 25° C. of from 500 to 100,000 mPa·s.

4. The composition according to claim 1, wherein the component-(B) compound is selected from the group consisting of dimethyldi(butanoxime)silane, methyltri(butanoxime)silane, vinyltri(butanoxime)silane, phenyltri(butanoxime)silane, propyltri(butanoxime)silane, tetra (butanoxime)silane, 3,3,3-trifluoropropyltri(butanoxime) silane, 3-chloropropyltri(butanoxime)silane, methyltri (propanoxime)silane, methyltri(pentanoxime)silane, methyltri(isopentanoxime)silane vinyltri (cyclopentanoxime)silane, methyltri(cyclohexanoxime) silane, dimethyldimethoxysilane, methyltrimethoxysilane, vinyltrimethoxysilane, phenyltrimethoxysilane, methyltriethoxysilane, tetramethoxysilane, tetraethoxysilane, vinyltripropenoxysilane, phenyltripropenoxysilane, methyltriacetoxysilane, ethyltriacetoxysilane, phenyltriacetoxysilane, vinyltriacetoxysilane and tetraacetoxysilane.

5. A cured product obtained by curing the composition as defined in claim 1.

6. The composition according to claim 1, wherein the component-(C) wet-process silica has a water content of from 1% by weight to 10% by weight.

7. The composition according to claim 1, wherein the component-(C) wet-process silica has a water content of from 1.5% by weight to 5% by weight.

8. The composition according to claim 1, wherein, in preparing the composition, the component-(C) wet-process silica and the component-(A) organopolysiloxane are mixed at a temperature lower than 100° C.

9. The composition according to claim 1, wherein the components (A) to (C) are kept divided into two parts in such a way that the component (B) belongs to one of the two parts and the component (C) belongs to the other part and the two parts are blended when used.

10. The composition according to claim 1, which further comprises a curing catalyst.

11. The composition according to claim 10, wherein said curing catalyst is a compound selected from the group consisting of an organometallic compound, an aminoalkyl-substituted alkoxysilane, an amine compound, a salt of the amine compound, a quaternary ammonium salt, an alkali metal lower fatty acid salt, a dialkylhydroxylamine, a silane containing a guanidyl group, and a siloxane containing a guanidyl group.

12. The composition according to claim 1, which further comprises a solvent in which components (A) and (B) of the silicone composition are soluble, selected from the group consisting of a branched or straight-chain paraffinic saturated hydrocarbon solvent, an aromatic hydrocarbon solvent, isopropyl alcohol, methyl ethyl ketone, cyclohexanone, hexamethyldisiloxane and octamethyltetrasiloxane.

13. The composition according to claim 12, wherein the components (A) to (C) are contained in a concentration of from 1% by weight to 99% by weight.

* * * * *